April 2, 1935.  G. J. MEYER  1,996,586
SWIVELING CHAIN
Filed March 5, 1932
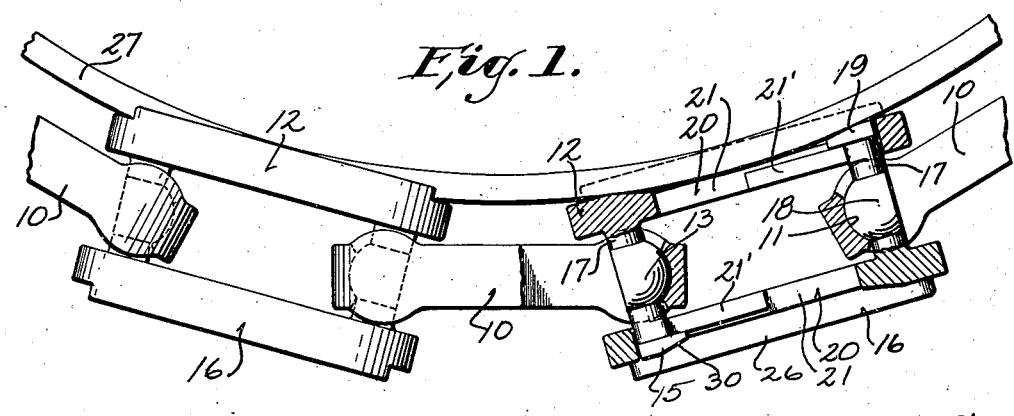
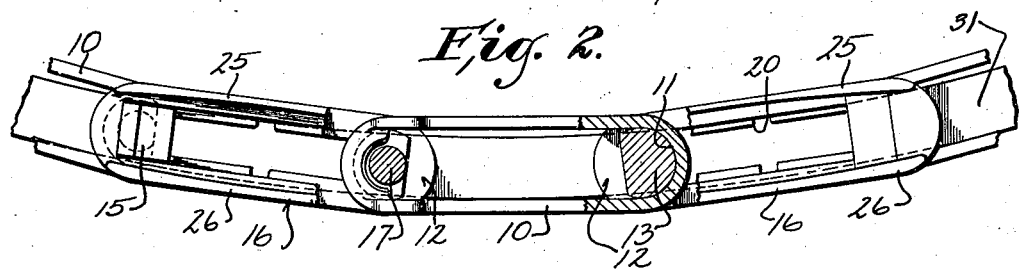
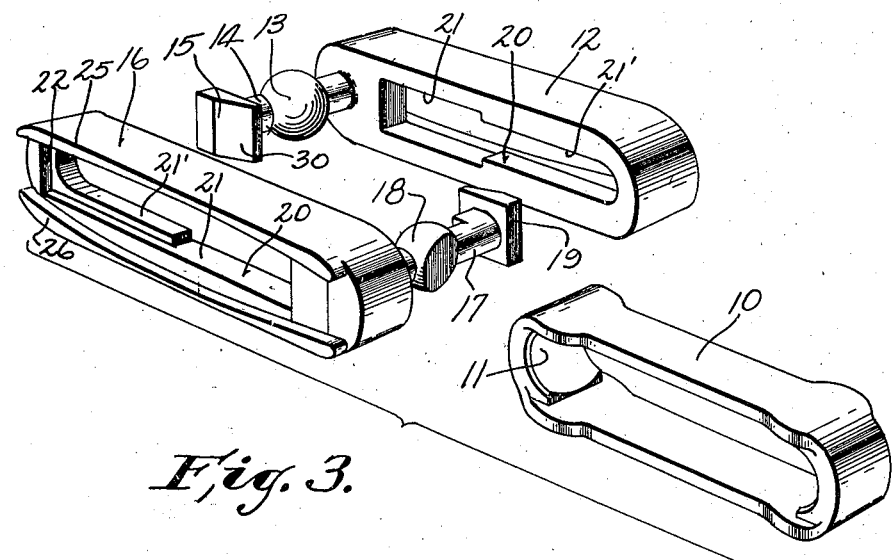
Inventor
George J. Meyer
By Wheeler, Wheeler & Wheeler
Attorneys Patented Apr. 2, 1935

1,996,586

UNITED STATES PATENT OFFICE 1,996,586

SWIVELING CHAIN

George J. Meyer, Cudahy, Wis., assignor to Geo. J. Meyer Manufacturing Co., a corporation of Wisconsin Application March 5, 1932, Serial No. 596,979

8 Claims. (Cl. 198—189)

My invention relates to an improvement in swiveling chains.

The object of my invention is to provide a chain composed of links so constructed as to permit the chain to move articulately in curves lying in a number of different planes and to cooperate with guide rails and guide flanges of sprocket wheels so that a chain made in accordance with my invention may be used to particular advantage in conveyor installations where the path to be followed by the chain may curve in a multitude of different directions consecutively.

More specifically stated, it is the object of my invention to provide a chain wherein the various lengths may articulate hingedly and simultaneously articulate with a swiveling action to change the direction of movement of the chain within certain practical limitations, but in almost any direction.

In the drawing:

Figure 1 is a plan view of a portion of a chain embodying my improved chain links in position against a guide rail on a curve.

Figure 2 is a vertical longitudinal section of a chain embodying my invention.

Figure 3 is a composite view of the parts of my chain in disassembled relation.

Like parts are identified by the same reference characters throughout the several views.

As shown most clearly in Fig. 3, my chain is formed of two types of links, one of which as shown at 10 comprises an integral ovoid loop stretcher terminating at either end in a partial spheroid concave bearing member 11. The other link is a two part interlocked guide-link made up of two side bars 12 and 16, respectively provided integrally with pintle members 14 and 17. Each pintle member is provided with a spheroidal bearing portion 13 and 18 and each pintle has a head 15 and 19 respectively which is so formed as to interlock with portions of the side members 12 and 16 respectively as will be hereinafter described.

Each of the side rails 12 and 16 is provided with a web 20 slotted widely at 21 and more narrowly at 21' so that the heads 15 and 19 respectively of the pintles may be received through the widely slotted portion 21 and then as the side members 12 and 16 are moved with respect to each other, the heads 15 and 19 are moved to the ends of the slots where they abut a shoulder 22.

Assuming that a stretcher link 10 has been assembled upon each of the pintles 14 and 17 the assembly of the two side rails 12 and 16 through the inter-locking of the heads 15 and 19 in the slots 21 and 21' and against the shoulder 22 provides the completed chain.

Each of the side rails 12 and 16 is provided with a top and bottom flange 25 and 26 curved as shown most clearly in Fig. 3. These flanges serve as guides for the chain to prevent the individual links from deviating from a course prescribed by a guide rail or guide flange 27 on a curve as indicated in Fig. 1 when the chain is executing a lateral curve. To receive the curved guide rail intermediate the ends of the side rails the heads of the pintles are angularly clipped at 30.

If the swiveling chain is to operate in another curve as illustrated in Fig. 2 the guide rail 31 will be received between the flanges 25 and 26 which conform to the maximum curvature of the rail 31. A pair of rails, one for each side of the assembled link may be used to guide a chain embodying my invention where there is liklihood that the links of my chain may be misaligned swivelingly on a curve.

I claim:

1. A chain and guide therefor comprising in combination a guide rail curved consecutively in a plurality of planes, and a chain link provided with means for receiving and engaging said guide, said means presenting surfaces to contact with and conform to the curvature of said guide rail in each of its plurality of planes.

2. The combination with a guide rail curved consecutively in a plurality of planes and chain therefor, of alternate narrow and wide links for said chain, said wide links being provided with vertically spaced end portions to receive and contact the rail to guide the chain around vertical curvatures of the rail, and side openings to receive the curvature of the rail therebetween to guide the chain around horizontal curves.

3. The combination with a guide rail curved consecutively in a plurality of planes and link chain therefor, of alternate links being provided with spaced end portions to receive and contact the rail on curves in a horizontal plane, and vertically spaced curved flanges extending between said end portions to engage the rail along perpendicular curves.

4. The combination with a guide rail curved consecutively in a plurality of planes and a linked chain therefor adapted for articulate swiveling movement, of alternate narrow and wide links in said chain, said wide links comprising a pair of elements adapted for interlocking connection, each of said elements provided with outwardly extending lugs adapted to receive said side rail and be guided by the same in any of its plurality of planes.

5. The combination with a guide rail curved consecutively in a plurality of planes and a linked chain for articulate swiveling movement to be guided by said rail, said linked chain comprising a series of alternate narrow and wide links, said wide link comprising a pair of side bars having pintles formed integral therewith, said side bars adapted for interlocking connection to form one link of said chain, outwardly extending lugs on each of said side bars, said lugs adapted to receive said guide rail and form guides for directing the movement of said links on said curved guide rail.

6. The combination with a guide rail curved consecutively in a plurality of planes and a linked chain for articulate swiveling movement to be guided by said rail, said linked chain comprising a series of alternate narrow and wide links, said wide links comprising a pair of longitudinally slotted side bars each having a pintle formed integral therewith adjacent one end thereof, said pintles and slots cooperating to effect interconnection between said elements to form said links, guide faces formed adjacent the ends of said slotted side bars for cooperation with said guide rail when the same is curved in a horizontal plane, outwardly extending top and bottom lugs on said side bars, curved faces on said lugs adapted to cooperate with said guide rail when the same is curved in vertical planes.

7. The combination with a guide rail curved consecutively in a plurality of planes and a linked chain for articulate swiveling movement to be guided by said rail, said linked chain comprising a series of alternate narrow and wide links, said wide links comprising a pair of interlocking elements, guide faces on each of said elements for contact with said guide rail when the same is curved in horizontal planes, outwardly extending upper and lower lugs on said side bars, and contact faces on said lugs adapted to cooperate with said guide rail when the same is curved in vertical planes.

8. The combination with a guide rail curved consecutively in a plurality of planes of a linked chain comprising a series of alternate narrow and wide links adapted for articulate swiveling movement along said guide rail, alternate links of said chain being formed of two parts adapted for interlocking connection, vertical guide faces on alternate links of said chain for contact with said guide rail when the same is curved in horizontal planes, and a plurality of outwardly extending spaced lugs on said links, horizontally disposed guide faces on said outwardly extending lugs for contact with said guide rail when the same is curved in a vertical plane.

GEORGE J. MEYER.